United States Patent [19]

Pokorny

[11] 4,329,442

[45] May 11, 1982

[54] HIGH ADHESION PLUGGING AND ENCAPSULATING POLYURETHANE PREPARED FROM A POLYOL, A TRI OR TETRA FUNCTIONAL ALIPHATIC POLYOL AND A MONOFUNCTIONAL ALIPHATIC ALCOHOL

[75] Inventor: Richard J. Pokorny, Woodbury, Minn.

[73] Assignee: Minnesota Mining and Manufacturing Company, St. Paul, Minn.

[21] Appl. No.: 234,568

[22] Filed: Feb. 13, 1981

[51] Int. Cl.³ .............................................. C08G 18/30
[52] U.S. Cl. ...................................................... 528/49
[58] Field of Search .......................................... 528/49

[56] References Cited

U.S. PATENT DOCUMENTS

| | | | |
|---|---|---|---|
| 4,087,412 | 5/1978 | Groves | 260/18 TN |
| 4,102,716 | 7/1978 | Groves et al. | 156/48 |
| 4,168,363 | 9/1979 | Boettcher | 260/31.8 N |
| 4,280,944 | 7/1981 | Saito et al. | 528/49 |

FOREIGN PATENT DOCUMENTS 2847387  5/1980  Fed. Rep. of Germany .

*Primary Examiner*—Maurice J. Welsh
*Attorney, Agent, or Firm*—Cruzan Alexander; Donald M. Sell; Lorraine R. Sherman

[57] ABSTRACT

A polyurethane resin is prepared from an aliphatic or cycloaliphatic isocyanate, a polydiol, a tri or tetra functional aliphatic polyol, and a monofunctional aliphatic alcohol, in the presence of a suitable catalyst. The resin exhibits superior adhesion to greasy wires in communication and electrical cable.

17 Claims, No Drawings

HIGH ADHESION PLUGGING AND ENCAPSULATING POLYURETHANE PREPARED FROM A POLYOL, A TRI OR TETRA FUNCTIONAL ALIPHATIC POLYOL AND A MONOFUNCTIONAL ALIPHATIC ALCOHOL

TECHNICAL FIELD

This invention relates to a curable dielectric composition and the process for its use in blocking or splicing difficult to adhere to polyolefin insulated wires in communication or electrical cable. In another aspect, it relates to a cured polyurethane resin having high modulus and tensile strength, and superior adhesion to greasy wires.

BACKGROUND ART

It is common in the communications field to use cables containing up to 3000 or more pairs of conductors. These cables may be grease-filled or under air pressure to prevent moisture from reaching the individual wires within the cable, the effect of which would be to change the electrical properties of the wires or cause them to short out. It is the usual practice in the communications field to use large diameter pressurized cable near central office installations but, for reasons of economy, grease filled cable of smaller diameter are used in areas remote from a central office and closer to an individual user. At the transition splice between pressurized and grease filled cable a pressure block is required to prevent the pressurized air from entering the grease-filled cable and blowing out the grease. In such a situation, a plugging compound is used.

An encapsulating compound is needed when two non-pressurized cables, one or both of which may be grease filled, are to be spliced together. To prevent moisture from entering the splice, either the greasy conductors must be thoroughly cleaned, a time-consuming and expensive procedure in the field, or an encapsulating compound having high adhesion to greasy wires is required.

U.S. Pat. No. 4,102,716 discloses a polyurethane gel, which is an oil extended resin, that is useful as a filler for communication splices. This gel is of limited use with grease filled cable and is not suitable as a blocking or plugging compound due to its jelly-like consistency. U.S. Pat. No. 4,168,363 teaches a polyurethane blocking or splicing composition for repair of elastomeric cable jacket materials requiring a thickening agent, a liquid diluent, and filler materials in its formulation. The patentee claims good adhesion to clean elastomeric cable jacket material. BRD Offenlegungsschrift 28 47 387 discloses a tacky, elastic polyurethane-based filler for cable and insulated wire sealing that has a major polyester-polyether-polyol or polyester-polyol component, the diisocyanate component, to which no criticality as to type is disclosed, being a monomeric aryl, alkyl, or (ar)alkyl diisocyanate.

There exists a need in the art for a composition that will cure in situ under ambient conditions to provide a high modulus, high tensile strength filler composition having superior adhesion to greasy wires.

DISCLOSURE OF THE INVENTION

The present invention provides a curable, two-part pourable composition which provides a thermally and hydrolytically stable, moisture-insensitive dielectric polyurethane resin upon reaction, one part of the composition comprising an aliphatic or cycloaliphatic isocyanate compound, and the other part comprising an admixture of a predominantly terminal polydiol, a tri or tetra functional aliphatic polyol, a monofunctional aliphatic alcohol, and at least one catalyst capable of promoting a reaction between the isocyanate compound and the alcohol compounds.

The two parts, upon mixing thereof and upon curing, provide a generally non-tacky resin having excellent adhesive properties towards greasy wires and connectors. The resin possesses other desirable physical and electrical properties. The predominantly terminal diol contributes to the water-repellancy of the composition; the tri and tetra functional aliphatic polyol helps provide high modulus; and the monofunctional aliphatic alcohol accounts for the superior adhesion of the composition. The mixed composition is poured into a suitable mold surrounding the spliced wires and allowed to cure at ambient conditions for a reasonable time to a solid material or it may be subjected to an accelerated cure by heating. The procedure is suitable for application and repair procedures in the field and in factory preencapsulation. The mixed composition may also be injected into a cable to plug the cable from pressurized air having a force up to about 15 psi.

It appears novel in the art to admix mono- and polyfunctional alcohols with an aliphatic or cycloaliphatic isocyanate to produce a polyurethane resin having superior adhesive properties and at the same time retaining the modulus needed for use as a plugging and encapsulating material. While low modulus values are acceptable in encapsulating materials, it has been found that a modulus value greater than about 80 kg/cm$^2$ is required for plugging of filled cable. Compounds having useful plugging properties with greasy wires exhibit wire pull values (for test method, see footnote (1) to TABLE I) of at least 25 newtons, preferably at least 30 newtons. Curable compositions of the present invention are pourable materials having viscosities in the range of 500 to 3,000 cps which allows penetration of the composition into the interstices of the cable.

DETAILED DESCRIPTION

The present invention provides a two-part composition which upon mixing is useful in the plugging and encapsulating of communication or other dielectric cable, the composition comprising, based on total polymer solids, an admixture of:
  (a) from about 15 to about 45 percent by weight of the admixture of at least one isocyanate compound having at least about 2.0 NCO groups per molecule and selected from the group consisting of aliphatic and cycloaliphatic isocyanate compounds having a molecular weight of less than about 1,000;
  (b) from about 30 to about 70 percent by weight of the admixture of at least one polyol, preferably aliphatic, having an average molecular weight of about 500 to about 3,000 and containing at least about 2.0 predominantly terminal hydroxyl groups per molecule;
  (c) from about 5 to about 20 percent by weight of the admixture of a tri or tetra functional aliphatic polyol having a molecular weight of about 100 to 700;
  (d) from about 3 to about 30 percent of a monofunctional aliphatic alcohol having from about 3 to 100 carbon atoms; and (e) up to about 5 percent by weight of the admixture of at least one catalyst capable of promoting a reaction between the isocyanate compound and the polyols and monofunctional alcohol compounds, the catalyst being preferably a dialkyl organo tin compound, and most preferably a trialkyl tin oxide; wherein said isocyanate compound is present in sufficient quantity to provide an NCO/OH ratio of from about 0.9 to 1.1 in the admixture.

Organic isocyanates having utility herein include aliphatic and cycloaliphatic isocyanates having at least two NCO groups per molecule. Exemplary of such isocyanates are dimer acid diisocyanates derived from a $C_{36}$ dibasic acid, trimethylhexamethylene diisocyanate, or 4,4'-methylene-bis(cyclohexylisocyanate), as well as mixtures of such isocyanates, with isophorone diisocyanate being the preferred compound.

The predominantly terminal polydiols of paragraph (b) above useful in the invention herein are liquid or quasi-liquid polymers derived, for example, from the polymerization of butadiene, isoprene, or mixtures thereof, or copolymers derived from the random copolymerization of vinyl monomers, e.g., styrene or methyl styrene, with compounds such as butadiene. The preferred polymers and copolymers are polyalkadiene polyols and have at least about 2.0 predominantly terminal hydroxyl groups per molecule, e.g., about 2.1, and can have as high as about 2.6, or even 3.0 terminal hydroxyl groups per molecule. Further, hydrogenated derivatives of the polyalkadiene polymers, i.e., those having about 70 to about 95 percent hydrogenation, which are waxy solids, are also capable of providing useful dielectric resins herein, such materials possessing improved thermal and hydrolytic stability. These polyalkadiene polyols should have an average molecular weight of at least about 500 to insure flexibility of the cured resin. For maximum compatibility and optimum physical properties of the cured polyurethane composition, polyols having an average molecular weight of about 1000 to about 3000 are preferred. However, small amounts of the polyalkadiene polyol can be replaced by polyether polyols and/or ricinoleate derivatives, such as castor oil and the like, having about 2 to about 4 hydroxyl groups per molecule and an equivalent weight of from about 300 to about 1500. These materials have been found to be compatible in the curable compositions of the present invention and can produce useful dielectric resins. When used in substantial amounts, these substances tend to reduce the desired adhesion to greasy wires and should be limited in their collective use to about 20% of the polyol component (b).

Besides the polyalkadiene polyol and reactive polyether or castor oil-derived polyols, there can also be employed small amounts, i.e., less than about 20 percent by weight of the polyol portion, of compatible lower molecular weight, reactive, chain-extending or cross-linking compounds having molecular weights typically of about 300 or less, and containing therein about 2 to about 4 hydroxyl groups. Materials containing aromatic groups therein, such as N,N-bis(2-hydroxypropyl)aniline have been found to be compatible and to thereby produce useful dielectric resins when used herein. Conversely, compounds such as ethylene glycol, 1,4-butanediol, trimethylol propane, and pentaerythritol have been found to be immiscible, and therefore incompatible, with the dielectric polymer resins.

To insure sufficient crosslinking in the cured resin, the tri and tetra polyol-based component should contain polyols of hydroxyl functionality between about 3 and 4, having a molecular weight of from between about 100 and about 1,000, and more preferably 150 to 600. Examples of such polyols include polyoxypropylene glycol, polyoxyethylene glycol, polyoxytetramethylene glycol, and small amounts of polycaprolactone glycol. The preferred polyol is Quadrol®, N,N,N',N'-tetrakis(2-hydroxypropyl)-ethylene diamine, available from BASF Wyandotte Corp.

The monofunctional alcohol component of the present invention is a branched or straight chain aliphatic alcohol having up to about 100 carbon atoms, and preferably contains three to thirty carbon atoms. This component acts as an internal plasticizer as well as an internal surfactant to promote better adhesion between the cured polyurethane resin and greasy materials. Examples of such alcohols include isopropanol, octanol, dodecanol, tridecyl alcohol, octadecanol, isohexacosanol, and Primarol 1511® (a mixture of $C_{24}$-$C_{28}$ 2-alkyl alcohols available from Henkel Corp.).

In conventional fashion by a pre-reaction mechanism, the isocyanate component can be prereacted with a portion of the polyol component to form an isocyanate-terminated prepolymer, which when subsequently reacted with the remaining alcohol components will produce a urethane resin having the requisite properties.

The isocyanate should be present in a stoichiometric amount, i.e., in sufficient quantity to provide an NCO/OH ratio from about 0.9 to about 1.1.

Non-reactive liquids or solids containing a substantial halogen content therein can be included if flame retardancy of the composition is desired. Examples of such compounds include halogenated biphenyl, halogenated biphenyl oxide, and halogenated alicyclics. In addition, materials which conventionally act synergistically with halogens to increase flame resistance, such as antimony trioxide, can be included therewith.

Compounds which serve as antioxidants, such as oxydecyl bis(3,5-t-butyl-4-hydroxyphenyl)propionate, or Irganox 1076® (CIBA-Geigy Corp.) can be similarly included.

Also contained in the polyol component are compounds which are capable of serving as catalysts for the isocyanate/hydroxyl reaction and are suitable for the particular combination of polyols and isocyanates chosen. Up to about 5 percent by weight of the admixture of at least one catalyst has been found useful in the composition of the invention. Examples of such compounds include tetravalent tin compounds, metal acetyl acetonates, and organo mercury compounds. Preferred is a catalytic amount of the organotin catalyst system comprising a mixture of a bis(tri-n-alkyl tin) oxide and the reaction product of a carboxylic acid and a dialkyl tin oxide. This organotin catalyst system is disclosed in U.S. Pat. No. 4,087,412 which is hereby incorporated herein by reference.

It is anticipated that the composition after mixing will be simply poured into a mold surrounding the spliced cables and a pourable liquid is therefore the most suitable state for the composition to be in. In this instance, the composition should be of sufficiently low viscosity to be pourable, i.e., in the range of 500 to 3,000 cps at room temperature. The composition cures readily at ambient conditions. The liquid composition cures to a solid at about 25° C. in from 5 min. to 1 hr., with the preferred cure time being from 10 to 30 min. The cure time can be reduced to about 5 to 10 min. by heating the composition up to about 70° C.

The cured resin which contains no substantial amount of polyethers, polyesters, aromatics, or plasticizers which would reduce adhesion to greasy materials exhibits high tensile strength and modulus, and unusually good adhesive properties towards greasy substances. The total amount of these substances present in the resin may be up to about 15% of the composition by weight. At concentration of 15% or less these substances do not substantially reduce the desired properties of the resins produced, although no polyethers, polyesters, aromatics, or plasticizers are required in the present invention.

A composition of the invention is typically stored in two parts prior to introduction to a spliced cable, with the reactive isocyanate (or isocyanate-terminated prepolymer) being present in one part, and the reactive polyol being present in the second part. As is well known in the art (see, for example, U.S. Pat. Nos. 2,932,385, 2,967,795, 2,756,875, 3,074,544, 3,087,606, and 4,060,583), two-part compositions may conveniently be stored until use in separate compartments of a multicompartment unitary package. The compartments are typically separated by a membrane or seam which may be ruptured to allow mixing of the separate parts immediately prior to use.

Objects and advantages of this invention are further illustrated by the following examples, but the particular materials and amounts thereof recited in these examples, as well as other conditions and details, should not be construed to unduly limit this invention.

EXAMPLE 1

A two-part reactive encapsulant was prepared. The first part was an admixture of 28 parts of Poly BD ® (see footnote (f) to TABLE I) heated to 110° C. at a pressure of 10 Torr or less, and 72 parts of isophorone diisocyanate. The mixture was stirred for 15 minutes.

The second part was prepared by mixing 37.2 parts Primarol 1511 ® (see footnote (c) to TABLE I), 45.4 parts of Poly BD ® (see footnote (e) to TABLE I), 16.3 parts of Quadrol ® (see footnote (d) to TABLE I), 0.35 parts of Bio M & T TBTO ® (see footnote (f) to TABLE I), 0.17 parts of M & T catalyst T-8 ® (see footnote (g) to TABLE I), and 0.68 parts of Irganox 1076 ® (see footnote (h) to TABLE I). This mixture was stirred and heated to 110° C. and a vacuum of 10 Torr or less was applied for 1 hour. The composition was then cooled to room temperature.

The two parts were mixed at a ratio of 1:1.72 respectively, poured into a mold, and allowed to cure at room temperature. The cured material was a light yellow, transparent, tough resin. After one week, a dumbbell sample was cut out using Die A of ASTM D412. A tensile strength of 57 kg/cm$^2$ and a 20% modulus of 94 kg/cm$^2$ was measured at a 10 mm/sec crosshead speed.

Four 26 A.W.G. wires from a grease filled polyethylene insulated telephone cable were encapsulated in the uncured admixture prepared above to a depth of five cm. After one week, while holding the resin mass static, the wires were pulled out of the resin. It was necessary to use an average force per wire of 33 newtons at a pull-out rate of 5 mm/sec to extract the greasy wires from the resin mass.

EXAMPLES 2–14

Using the general method of EXAMPLE 1, the compositions of TABLE I, below, were prepared.

TABLE I

| Components | 2 | 3 | 4 | 5 | 6 | 7 | 8 | 9 | 10 | 11 | 12 | 13 | (control) 14 |
|---|---|---|---|---|---|---|---|---|---|---|---|---|---|
| Isopropyl alcohol | 7.4 | | | | | | | | | | | | |
| Octanol | | 14.6 | | | | | | | | | | | |
| Dodecanol | | | 15.2 | | | | | | | | | | |
| Tridecyl alcohol | | | | 20.9 | | | | | | | | | |
| Primarol 1511B ®$^{(a)}$ | | | | | 34.6 | | | | | 26 | | | |
| Octadecenol | | | | | | 19.1 | 22.7 | 20.0 | | | | | |
| Niax 2025 ®$^{(b)}$ | | | 23.1 | | | 13.1 | | | | | | | |
| Diisodecyl adipate-DIDA | | | | | | | | | 11.8 | 10 | 10 | | |
| Primarol 1511 ®$^{(c)}$ | | | | | | | | | 28.5 | | 25 | 25 | |
| Quadrol ®$^{(d)}$ | 24.0 | 22.1 | 16.1 | 20.5 | 16.3 | 14.1 | 15.7 | 13.8 | 12.6 | 13 | 12 | 12 | 5 |
| Poly BD ®$^{(e)}$ | 66.9 | 61.6 | 44.7 | 57.1 | 47.9 | 53.3 | 60.5 | 53.4 | 48 | 50 | 47 | 47 | 100 |
| TBTO ®$^{(f)}$ | 0.5 | 0.5 | 0.23 | 0.44 | 0.34 | 0.30 | 0.29 | 0.26 | 0.4 | 1 | 0.4 | 0.4 | 0.5 |
| M & T catalyst T-8 ®$^{(g)}$ | 0.26 | 0.24 | 0.11 | 0.22 | 0.16 | 0.15 | 0.14 | 0.12 | 0.2 | | 0.2 | 0.2 | 0.25 |
| Irganox 1076 ®$^{(h)}$ | 0.94 | 0.87 | 0.56 | 0.80 | 0.64 | | 0.70 | 0.60 | 0.5 | | 0.5 | 0.5 | |
| Isophorone diisocyanate, IPDI | 61.6 | 56.9 | 44.0 | 52.8 | 42.6 | 37.6 | 42.6 | 37.6 | 32.3 | 33.4 | 28.8 | 22.4 | 29.2 |
| Poly BD ®$^{(e)}$ | 23.9 | 22.1 | 12.3 | 20.5 | 16.5 | | 16.5 | 14.6 | | | | | |
| Isonate 143 L ®$^{(i)}$ | | | | | | | | | | | 4 | 12.3 | |
| Isonol C-100 ®$^{(j)}$ | | | | | | | | | | | | | 10 |
| Modulus (kg/cm$^2$)$^{(k)}$ | 410 | 450 | 150 | 220 | 200 | 210 | | 75 | 84 | 77 | 98 | | 170 |
| Wire pull (newtons)$^{(l)}$ | 29 | 30 | 29 | 26 | 30 | 34.5 | 34 | 30.5 | 36 | 36 | 29 | 26 | 23 |

*unless otherwise specified, all measurements are in grams
$^{(a)}$Primarol 1511 B ®-Isohexacosanol (C$_{26}$ alcohol) from Henkel
$^{(b)}$NIAX 2025 ®-2000 MW polyether polyol from Union Carbide Corp.
$^{(c)}$Primarol 1511 ®-mixture of C$_{24}$, C$_{26}$, and C$_{28}$ 2-alkyl alcohols, available from Henkel Corp.
$^{(d)}$Quadrol ®-N,N,N',N'-tetrakis(2-hydroxypropyl)-ethylene diamine, available from BASF Wyandotte Corp.
$^{(e)}$Poly BD ®-hydroxyl-terminated polybutadiene resin having an equivalent weight of about 1358 and an average of 2.0 to 2.5 hydroxyl groups per molecule available from ARCO Chemical Co.
$^{(f)}$TBTO ®-bis(tri-n-butyl tin) oxide, available from the Metal and Thermite Co.
$^{(g)}$M & T catalyst T-8 ®-dibutyl tin di(2-ethylhexanoate), available from the Metal and Thermite Co.
$^{(h)}$Irganox 1076 ®-octadecylbis(3,5-t-butyl-4-hydroxy-phenyl)propionate, antioxidant, available from CIBA-Geigy Corp.
$^{(i)}$Isonate 143L ®-diphenyl methane isocyanate from Upjohn Co.
$^{(j)}$Isonol C-100 ®-N,N-bis(2-hydroxypropyl)aniline, available from Upjohn Co.
$^{(k)}$Modulus-Tensile Strength/Elongation measured at 20% elongation at 10mm/sec crosshead speed.
$^{(l)}$Wire Pull-26 A.W.G. wires from a grease filled polyethylene insulated telephone cable were encapsulated with resin to a depth of five cm. These were pulled out of the compound at a rate of 5mm/sec with the maximum pull-out force being measured.

In addition to the modulus and wire pull data given in the table for the cured compositions, the uncured compositions, except for the control (Example 14) which contained no monofunctional alcohol, were all pourable and had viscosities in the range of 500 to 3,000 cps at room temperature. The viscosity of the control was 3,600 cps. Examples with modulus values less than about 80 were satisfactory encapsulating materials but were not useful for plugging.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A dielectric, thermally stable, hydrolytically stable, moisture-insensitive polyurethane resin comprising the reaction product of an admixture of:
   (a) from about 15 to about 45 percent by weight of said admixture of at least one isocyanate compound having at least about 2.0 NCO groups per molecule and selected from the group consisting of aliphatic and cycloaliphatic isocyanate compounds having a molecular weight of less than about 1,000;
   (b) from about 30 to about 70 percent by weight of said admixture of at least one polyol having an average molecular weight of at least about 500 to about 3,000 and containing at least about 2.0 predominantly terminal hydroxyl groups per molecule;
   (c) from about 5 to about 20 percent by weight of said admixture of a tri or tetra functional aliphatic polyol having a molecular weight of about 100 to about 700;
   (d) from about 3 to about 30 percent of a monofunctional aliphatic alcohol having 3 to 100 carbon atoms; and
   (e) up to about 5 percent by weight of said admixture of at least one catalyst capable of promoting a reaction between said isocyanate compound and said polyol and monofunctional alcohol compounds;
   wherein said isocyanate compound is present in sufficient quantity to provide an NCO/OH ratio of from about 0.9 to 1.1 in said admixture.

2. The resin according to claim 1 wherein said polyol of paragraph (b) is aliphatic.

3. The resin according to claim 1 wherein said polyol of paragraph (b) is a polyalkadiene polyol.

4. The resin according to claim 1 wherein said monofunctional alcohol has 3 to 30 carbon atoms.

5. The resin according to claim 1 wherein said isocyanate compound is isophorone diisocyanate.

6. The resin according to claim 1 wherein said catalyst is an organotin catalyst system.

7. A process for filling a cable splice closure between cables with a dielectric, thermally stable, hydrolytically stable, moisture-insensitive polyurethane resin, comprising the steps of:
   (a) pouring into a suitable mold surrounding said splice closure the reaction product of an admixture comprising:
      (1) from about 15 to about 45 percent by weight of said admixture of at least one isocyanate compound having at least about 2.0 NCO groups per molecule and selected from the group consisting of aliphatic and cycloaliphatic isocyanate compounds having a molecular weight of less than about 1,000;
      (2) from about 30 to about 70 percent by weight of said admixture of at least one polyol having an average molecular weight of at least about 500 to about 3,000 and containing at least about 2.0 predominantly terminal hydroxyl groups per molecule;
      (3) from about 3 to about 20 percent by weight of said admixture of a tri or tetra functional aliphatic polyol having a molecular weight of about 100 to about 700;
      (4) from about 3 to about 30 percent of a monofunctional aliphatic alcohol having 3 to 100 carbon atoms; and
      (5) up to about 5 percent by weight of said admixture of at least one catalyst capable of promoting a reaction between said isocyanate compound and said polyol and monofunctional alcohol compounds;
   wherein said isocyanate compound is present in sufficient quantity to provide an NCO/OH ratio of from about 0.9 to 1.1 in said admixture, and
   (b) curing said admixture.

8. A process according to claim 7 wherein said curing takes place at ambient conditions.

9. A process according to claim 7 wherein said curing takes place at temperatures up to 70° C.

10. A communication cable splice closure filled per the process of claim 7.

11. A two-part composition disposed in a single unitary package with the parts of the composition stored in separate compartments within the package and adapted upon mixing for use in the blocking or splicing of communication cable, the composition comprising, based on total polymer solids:
   (1) in one part
      (a) from about 15 to about 45 percent by weight of said admixture of at least one isocyanate compound having at least about 2.0 NCO groups per molecule and selected from the group consisting of aliphatic and cycloaliphatic isocyanate compounds having a molecular weight of less than about 1,000; and
   (2) in a second part
      (b) from about 30 to about 70 percent by weight of said admixture of at least one polyol, having an average molecular weight of about 500 to about 3,000 and containing at least about 2.0 predominantly terminal hydroxyl groups per molecule;
      (c) from about 5 to about 20 percent by weight of said admixture of a tri or tetra functional aliphatic polyol having a molecular weight of about 100 to 700;
      (d) from about 3 to about 30 percent of a monofunctional aliphatic alcohol having 3 to 100 carbon atoms; and
      (e) up to about 5 percent by weight of said admixture of at least one catalyst capable of promoting a reaction between said isocyanate compound and said polyols and monofunctional alcohol compounds;
   wherein said isocyanate compound is present in sufficient quantity to provide an NCO/OH ratio of from about 0.9 to 1.1 in said admixture.

12. The composition according to claim 11 wherein said polyol of paragraph (b) is aliphatic.

13. The composition according to claim 11 wherein said polyol of paragraph (b) is a polyalkadiene polyol.

14. The composition according to claim 11 wherein said monofunctional alcohol has 3 to 30 carbon atoms.

15. The composition according to claim 11 wherein said isocyanate compound is isophorone diisocyanate.

16. The composition according to claim 11 wherein said catalyst is an organotin catalyst system.

17. The composition according to claim 11 wherein in said part one, said isocyanate compound (a) is prereacted with a portion of one or both of said polyol compounds (b) and (c), to form an isocyanate-terminated prepolymer.

* * * * *

UNITED STATES PATENT AND TRADEMARK OFFICE
CERTIFICATE OF CORRECTION

PATENT NO. : 4,329,442

DATED : May 11, 1982

INVENTOR(S) : Richard J. Pokorny

It is certified that error appears in the above—identified patent and that said Letters Patent is hereby corrected as shown below:

Column 8, line 7, replace "about 3 to about 20 percent" with --- about 5 to about 20 percent ---.

Signed and Sealed this

Fourteenth Day of September 1982

[SEAL]

Attest:

GERALD J. MOSSINGHOFF

Attesting Officer

Commissioner of Patents and Trademarks